United States Patent
Heap

(10) Patent No.: US 7,568,994 B2
(45) Date of Patent: Aug. 4, 2009

(54) CONTROL ARCHITECTURE FOR SELECTION OF OPTIMAL MODE OR GEAR AND INPUT SPEED FOR A HYBRID POWERTRAIN SYSTEM

(75) Inventor: Anthony H. Heap, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 440 days.

(21) Appl. No.: 11/561,156

(22) Filed: Nov. 17, 2006

(65) Prior Publication Data
US 2008/0120001 A1    May 22, 2008

(51) Int. Cl.
*B60K 1/02* (2006.01)
(52) U.S. Cl. .......................................... 477/3
(58) Field of Classification Search .............. 477/3; 701/54, 58, 59
See application file for complete search history.

(56) References Cited
U.S. PATENT DOCUMENTS

| | | | |
|---|---|---|---|
| 2008/0119321 A1* | 5/2008 | Heap | |
| 2008/0120002 A1* | 5/2008 | Heap | 701/54 |
| 2009/0069148 A1* | 3/2009 | Heap | 477/5 |
| 2009/0069989 A1* | 3/2009 | Heap | 701/51 |
| 2009/0070019 A1* | 3/2009 | Heap | 701/112 |

* cited by examiner

*Primary Examiner*—Dirk Wright

(57) ABSTRACT

There is provided a method and control system for a powertrain system comprising an internal combustion engine and first and second electrical machines and an electro-mechanical transmission selectively operative to transmit torque therebetween and operative in a plurality of fixed gear modes and continuously variable modes. The method comprises monitoring an output of the transmission, an operator torque request, and, available battery power. At least one permissible operating range state is identified, and a torque range for each permissible operating range state is determined. Preferred operating conditions and a preferred cost are determined for each permissible operating range state. A preferred operating range state is selected based upon the preferred costs for the permissible operating range states.

20 Claims, 6 Drawing Sheets

CONTROL ARCHITECTURE FOR SELECTION OF OPTIMAL MODE OR GEAR AND INPUT SPEED FOR A HYBRID POWERTRAIN SYSTEM

TECHNICAL FIELD

This invention pertains generally to control systems for powertrain control systems employing electro-mechanical transmissions.

BACKGROUND OF THE INVENTION

Powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from a prime mover power source, typically an internal combustion engine, and an output member for delivering motive torque from the transmission to the vehicle driveline. Electrical machines, operatively connected to an electrical energy storage device, comprise motor/generators operable to generate motive torque for input to the transmission, independently of torque input from the internal combustion engine. The electrical machines are further operable to transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission gear shifting, controlling the torque-generative devices, and regulating the electrical power interchange between the electrical energy storage device and the electrical machines.

The exemplary electro-mechanical transmissions are selectively operative in fixed gear modes and continuously variable modes through actuation of the torque-transfer clutches, typically employing a hydraulic circuit to effect clutch actuation. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection. Clutch actuation and deactivation is typically effected through a hydraulic circuit.

Engineers implementing powertrain systems having electro-mechanical transmissions with are tasked with implementing control schemes to effectively monitor system states and control operation of various systems and actuators to effectively control powertrain operation. Such a system is described hereinafter.

SUMMARY OF THE INVENTION

In accordance with an embodiment of the invention, a method and an apparatus are provided to control operation of a powertrain system comprising a torque transmission device operative to transmit torque input from a plurality of torque-generative devices.

The method comprises monitoring an output of the transmission, an operator torque request, and, available battery power. At least one permissible operating range state is identified, and a torque range for each permissible operating range state is determined. Preferred operating conditions and a preferred cost are determined for each permissible operating range state. A preferred operating range state is selected based upon the preferred costs for the permissible operating range states.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described in detail and illustrated in the accompanying drawings which form a part hereof, and wherein.

DETAILED DESCRIPTION OF AN EMBODIMENT OF THE INVENTION

Figure 1:
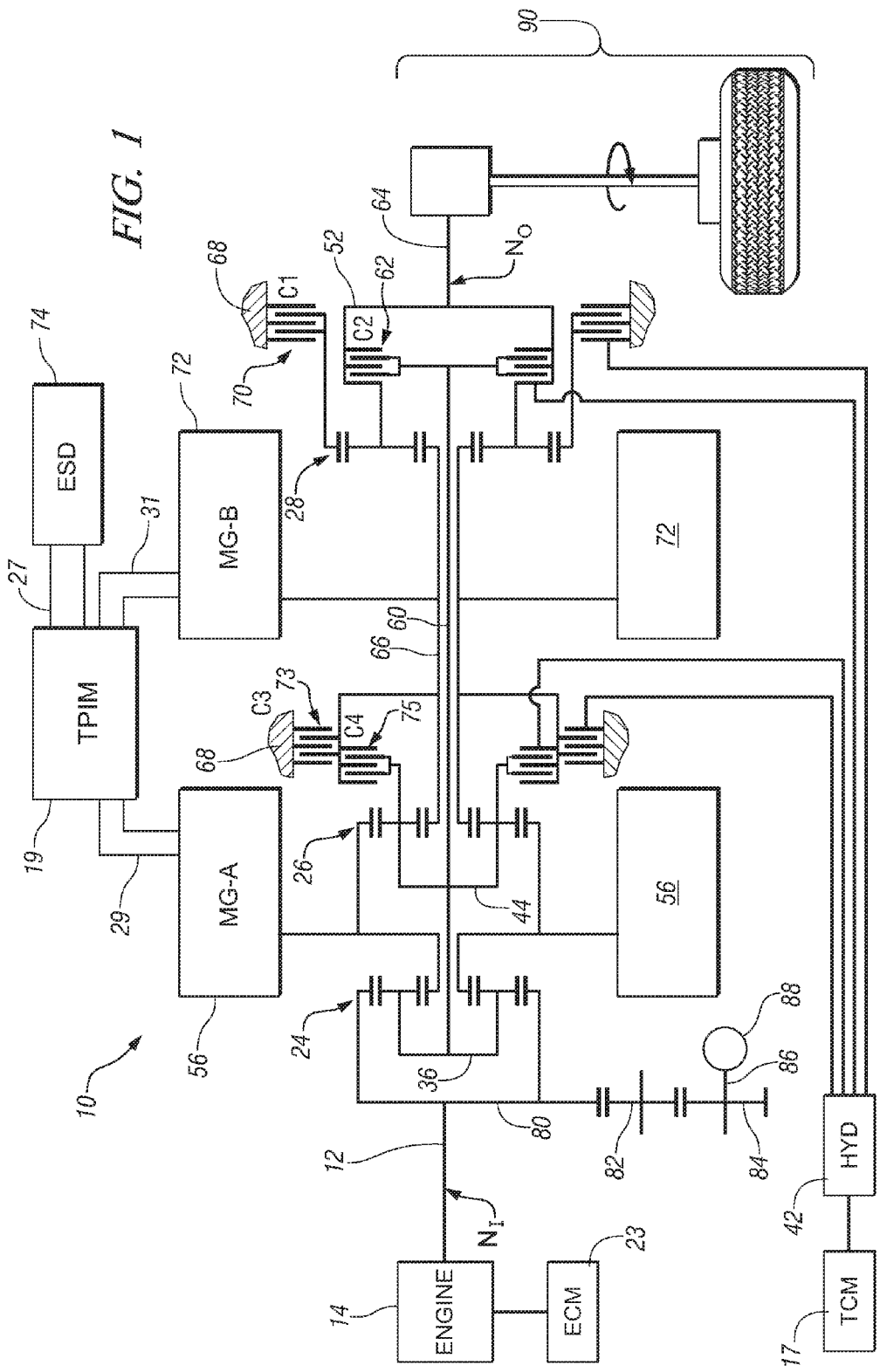
FIG. 1 is a schematic diagram of an exemplary powertrain, in accordance with the present invention.
Figure 2:
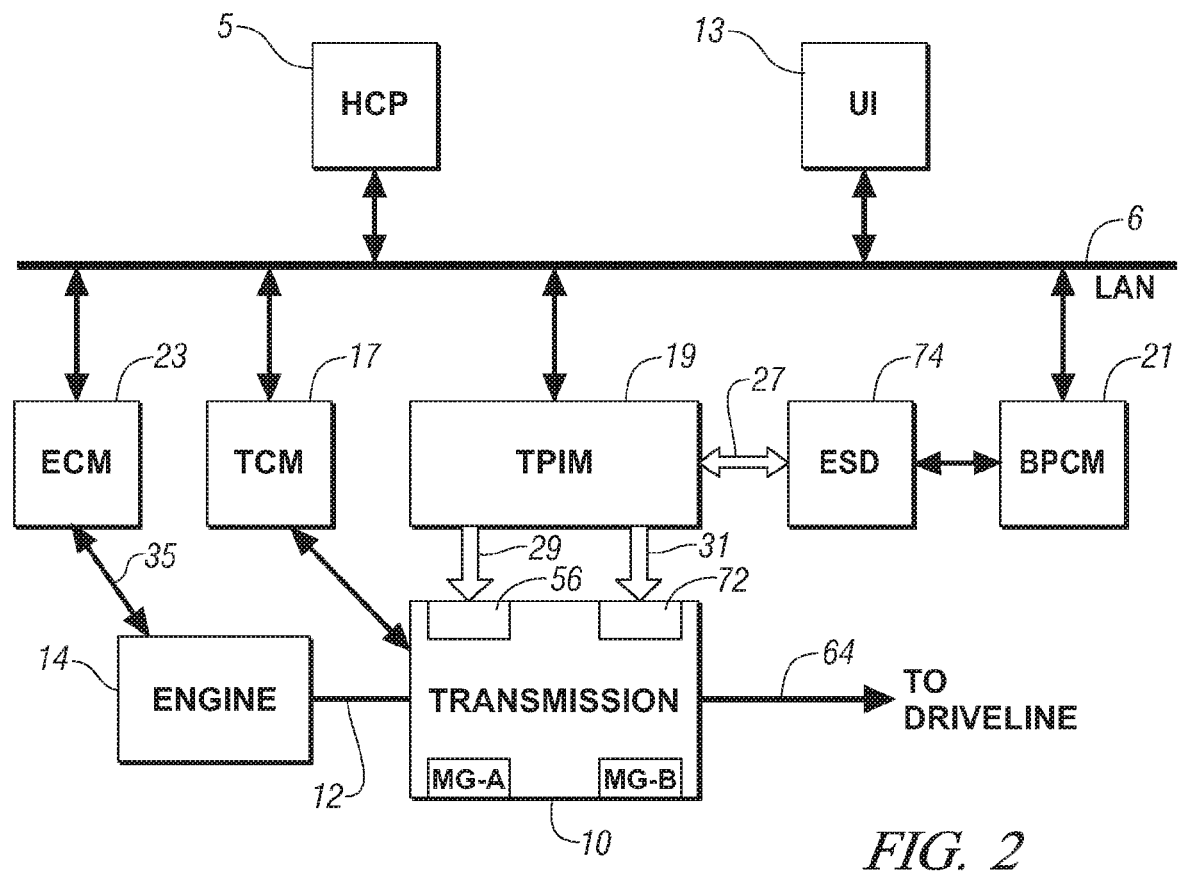
FIG. 2 is a schematic diagram of an exemplary architecture for a control system and powertrain, in accordance with the present invention.

Referring now to the drawings, wherein the showings are for the purpose of illustrating the invention only and not for the purpose of limiting the same, FIGS. 1 and 2 depict a system comprising an engine 14, transmission 10, control system, and driveline which has been constructed in accordance with an embodiment of the present invention.

Mechanical aspects of exemplary transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The exemplary two-mode, compound-split, electro-mechanical hybrid transmission embodying the concepts of the present invention is depicted in FIG. 1, and is designated generally by the numeral 10. The transmission 10 includes an input shaft 12 having an input speed, $N_I$ that is preferably driven by the internal combustion engine 14. The engine 14 has a crankshaft having characteristic speed $N_E$ which is operatively connected to the transmission input shaft 12. When a clutch device (not shown) operatively connects the engine and transmission, the engine speed $N_E$ and output torque $T_E$ can differ from transmission input speed $N_I$ and input torque $T_I$.

The transmission 10 utilizes three planetary-gear sets 24, 26 and 28, and four torque-transmitting devices, i.e., clutches C1 70, C2 62, C3 73, and C4 75. An electro-hydraulic control system 42, preferably controlled by transmission control module 17, is operative to control actuation and deactivation of the clutches. Clutches C2 and C4 preferably comprise hydraulically-actuated rotating friction clutches. Clutches C1 and C3 preferably comprise comprising hydraulically-actuated stationary devices grounded to the transmission case 68.

The three planetary gear sets 24, 26 and 28 each comprise simple planetary gear sets. Furthermore, the first and second planetary gear sets 24 and 26 are compounded in that the inner gear member of the first planetary gear set 24 is conjoined to an outer gear member of the second planetary gear set 26, and connected to a first electrical machine comprising a motor/generator 56, referred to as MG-A.

The planetary gear sets 24 and 26 are further compounded in that carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through clutch C2 62. The carrier 52 of the third planetary gear set 28 is connected directly to the transmission output member 64, which has an output rotational speed, $N_O$. An inner gear member of the second planetary gear set 26 is connected to an inner gear member of the third planetary gear set 28 through a sleeve shaft 66 that circumscribes shaft 60, and is connected to a second electrical machine comprising a motor/generator 72, referred to as MG-B.

All the planetary gear sets 24, 26 and 28 as well as MG-A 56 and MG-B 72 are coaxially oriented, as about the axially disposed shaft 60. MG-A and MG-B are both of an annular configuration which permits them to circumscribe the three planetary gear sets 24, 26 and 28 such that the planetary gear sets 24, 26 and 28 are disposed radially inwardly of MG-A and MG-B. Transmission output member 64 is operably connected to a vehicle driveline 90 to provide motive output torque, $T_O$ to vehicle wheels. Each clutch is preferably hydraulically actuated, receiving pressurized hydraulic fluid from a pump, described below, via an electro-hydraulic control circuit 42.

The transmission 10 receives input torque from the torque-generative devices, including the engine 14 and the MG-A 56 and MG-B 72, and referred to as '$T_I$', '$T_A$', and '$T_B$' respectively, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to TPIM 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality.

In motoring control, the respective inverter receives current from the DC transmission lines and provides AC current to the respective electrical machine, i.e., MG-A and MG-B, over transfer conductors 29 and 31. In regeneration control, the respective inverter receives AC current from the electrical machine over transfer conductors 29 and 31 and transmits current to the DC lines 27. The net DC current provided to or from the inverters determines the charge or discharge operating mode of the electrical energy storage device 74. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an operator torque request ('$T_{O\_REQ}$') output to driveline 90, the input torque $T_I$ originating from the engine, clutch torque, ('$T_{CL\_N}$') for the N various torque-transfer clutches C1, C2, C3, C4 of the transmission 10; and motor input torques $T_A$ and $T_B$ for MG-A and MG-B. The TCM 17 is operatively connected to the electro-hydraulic control circuit 42, including monitoring various pressure sensing devices (not shown) and generating and executing control signals for various solenoids to control pressure switches and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates a desired axle torque, and an indication of actual input torque, $T_I$, to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed, $N_E$, to shaft 12 which translate to transmission input speed, $N_I$, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques ($T_{CL\_EST\_N}$) for each of the N clutches C1, C2, C3, and, C4 and rotational speed, $N_O$, of the output shaft 64. Other actuators and sensors may be used to provide additional information from the TCM to the HCP for control purposes. The TCM 17 monitors inputs from pressure switches and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power.

The TPIM 19 includes previously referenced power inverters and motor control modules configured to receive motor control commands and control inverter states therefrom to provide motor drive or regeneration functionality. The TPIM 19 is operable to generate the torque commands for MG-A 56 and MG-B 72, i.e., $T_A$ and $T_B$, based upon input from the HCP 5, which is driven by operator input through UI 13 and system operating parameters. The motor torque commands for MG-A and MG-B are implemented by the control system, including the TPIM 19, to control MG-A and MG-B. Individual motor speed signals for MG-A and MG-B are derived by the TPIM 19 from the motor phase information or conventional rotation sensors. The TPIM 19 determines and communicates motor speeds to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds ('ms') during ongoing engine and vehicle operation. Alternatively, algorithms may be executed in response to occurrence of an event.

The exemplary two-mode, compound-split, electro-mechanical transmission operates in several operating range states, comprising fixed gear operating modes and continuously variable operating modes with the engine on and off, described with reference to FIG. 1, and Table 1, below.

TABLE 1

| Transmission Operating Range State | Actuated Clutches | |
|---|---|---|
| Mode I—Engine Off (M1_Eng_Off) | C1 70 | |
| Mode I—Engine On (M1_Eng_On) | C1 70 | |
| Fixed Ratio 1 (GR1) | C1 70 | C4 75 |
| Fixed Ratio 2 (GR2) | C1 70 | C2 62 |
| Mode II—Engine Off (M2_Eng_Off) | C2 62 | |
| Mode II—Engine On (M2_Eng_On) | C2 62 | |
| Fixed Ratio 3 (GR3) | C2 62 | C4 75 |
| Fixed Ratio 4 (GR4) | C2 62 | C3 73 |

The various transmission operating range states described in the table indicate which of the specific clutches C1, C2, C3, and C4 are engaged or actuated for each of the operating range states. Additionally, in various transmission operating range states, MG-A and MG-B may each operate as electrical motors to generate motive torque, or as a generator to generate electrical energy. A first mode, i.e., Mode I, is selected when clutch C1 70 is actuated in order to "ground" the outer gear member of the third planetary gear set 28. The engine 14 can be either on or off. A second mode, i.e., Mode II, is selected when clutch C1 70 is released and clutch C2 62 is simultaneously actuated to connect the shaft 60 to the carrier of the third planetary gear set 28. Again, the engine 14 can be either on or off. For purposes of this description, Engine Off is defined by engine input speed, $N_E$, being equal to zero revolutions per minute (RPM), i.e., the engine crankshaft is not rotating. Other factors outside the scope of the invention affect when the electrical machines 56, 72 operate as motors and generators, and are not discussed herein.

The control system, shown primarily in FIG. 2, is operable to provide a range of transmission output speeds at shaft 64 from relatively slow to relatively fast within each operating range state. The combination of two modes with a slow-to-fast output speed range in each range state allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e., either clutch C1 62 or C2 70, and by the controlled speed and torque of the electrical machines 56 and 72, which can be referred to as a continuously variable transmission mode. Certain ranges of operation are described below in which fixed gear ratios are achieved by applying an additional clutch. This additional clutch may be clutch C3 73 or C4 75, as shown in the table, above.

When the additional clutch is applied, fixed ratio operation of input-to-output speed of the transmission, i.e., $N_I/N_O$, is achieved. The rotations of machines MG-A and MG-B 56, 72 are dependent on internal rotation of the mechanism as defined by the clutching and proportional to the input speed measured at shaft 12. The machines MG-A and MG-B function as motors or generators. They are independent of engine to output power flow, thereby enabling both to be motors, both to function as generators, or any combination thereof. This allows, for instance, during operation in Fixed Ratio GR1 that motive power output from the transmission at shaft 64 is provided by power from the engine and power from MG-A and MG-B, through planetary gear set 28 by transmitting electrical power from ESD 74.

Figure 3:
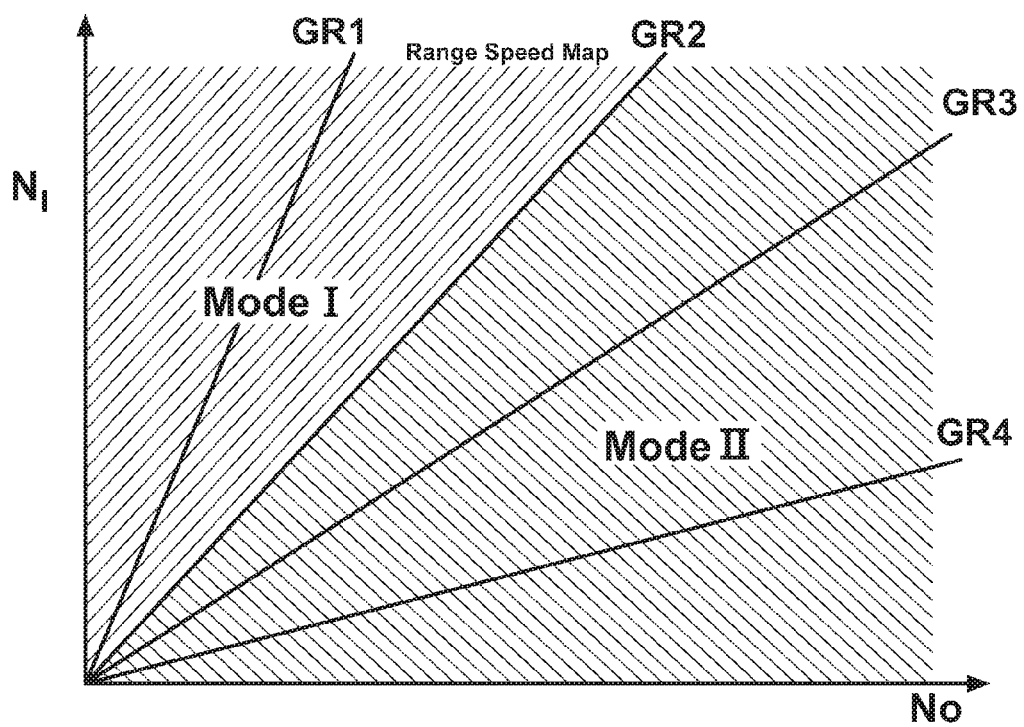
FIG. 3 is a graphical depiction, in accordance with the present invention.

Referring now to FIG. 3, various transmission operating modes are plotted as a function of transmission output speed, $N_O$, and transmission input speed, $N_I$ for the exemplary powertrain control system shown in FIGS. 1 and 2. The Fixed Ratio operation is shown as individual lines for each of the specific gear ratios, GR1, GR2, GR3, and GR4, as described with reference to Table 1, above. The continuously variable Mode operation is shown as ranges of operation for each of Mode I and Mode II. The transmission operating range state is switched between Fixed Ratio operation and continuously variable Mode operation by activating or deactivating specific clutches. The control system is operative to determine a specific transmission operating mode based upon various criteria, using algorithms and calibrations executed by the control system, and is outside the scope of this invention. Selection of the operating range state of the transmission depends primarily on the operator torque request $T_{O\_REQ}$ and the ability of the powertrain to meet that operator torque request.

Referring to Table 1 and again to FIG. 3, the low operating range state includes selective actuation of clutches C2, C1, and C4, facilitating operation in any one of continuously variable Mode I, and fixed gears GR1, GR2, and GR3. The high operating range state includes selective actuation of clutches C2, C3, and C4, facilitating operation in any one of continuously variable Mode II and fixed gears GR3 and GR4. It should be recognized that ranges of continuously variable operation for Mode I and Mode II may overlap.

In response to an operator's action, as captured by the UI 13, the supervisory HCP control module 5 and one or more of the other control modules determine the operator torque request, $T_{O\_REQ}$, at shaft 64. Selectively operated components of the transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque which affects how and when the vehicle accelerates or decelerates.

Final vehicle acceleration is affected by other factors, including, e.g., road load, road grade, and vehicle mass. The operating mode is determined for the exemplary transmission based upon a variety of operating characteristics of the powertrain. This includes demand for an operator demand for torque, typically communicated through inputs to the UI 13 as previously described. Additionally, a demand for output torque is predicated on external conditions, including, e.g., road grade, road surface conditions, or wind load. The operating mode may be predicated on a powertrain torque demand caused by a control module command to operate of the electrical machines in an electrical energy generating mode or in a torque generating mode. The operating mode can be determined by an optimization algorithm or routine operable to determine optimum system efficiency based upon operator demand for power, battery state of charge, and energy efficiencies of the engine 14 and MG-A and MG-B 56, 72. The control system manages torque inputs from the engine 14 and MG-A and MG-B 56, 72 based upon an outcome of the executed optimization routine, and system optimization occurs to optimize system efficiencies to improve fuel economy and manage battery charging. Furthermore, operation can be determined based upon a fault in a component or system. The HCP 5 monitors the parametric states of the torque-generative devices, and determines the output of the transmission required to arrive at the desired torque output, as described hereinbelow. Under the direction of the HCP 5, the transmission 10 operates over a range of output speeds from slow to fast in order to meet the operator demand.

Figure 4:
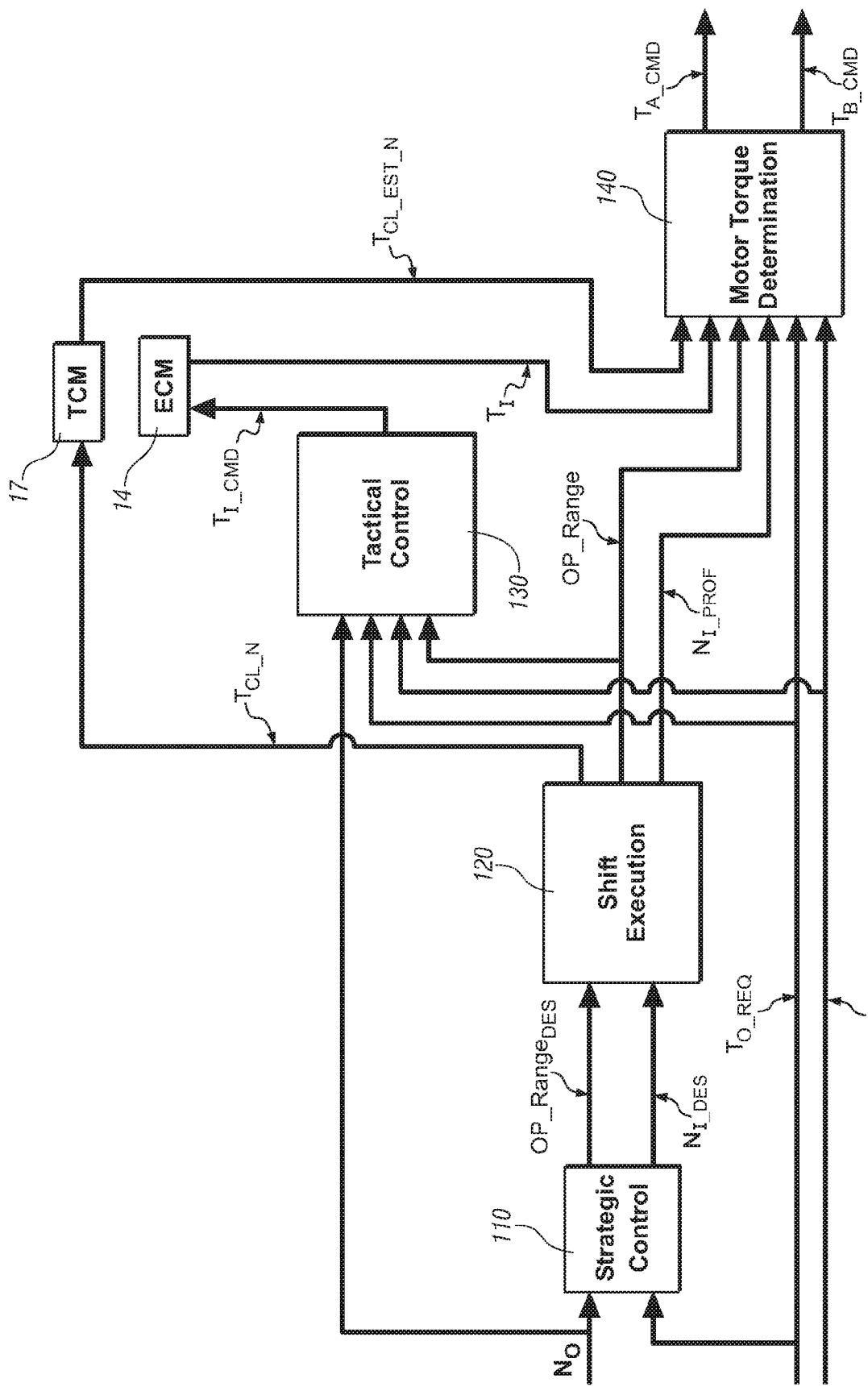
FIGS. 4-8 are schematic flowcharts, in accordance with the present invention.

Referring now to FIGS. 4-8, controlling operation of a hybrid powertrain is described, with reference to the exemplary powertrain described in FIGS. 1, 2, and 3. Referring specifically to FIG. 4, the method and system described herein comprise an aspect of strategic control optimization (Block 110), wherein a preferred or desired operating range state ($Op\_Range_{DES}$) is selected based primarily upon output speed, $N_O$, of shaft 64 and the operator torque request, $T_{O\_REQ}$. Output of the strategic control includes the preferred or desired operating range state ('$Op\_Range_{DES}$') and desired input speed ('$N_{I\_DES}$') each which are input to a shift execution control block 120. Other aspects of the overall architecture for strategic optimization and control of the exemplary powertrain are described in co-pending U.S. patent application Ser. No. 11/561,140, entitled CONTROL ARCHITECTURE FOR OPTIMIZATION AND CONTROL OF A HYBRID POWERTRAIN SYSTEM which is incorporated by reference, and need not be described herein.

Referring now to FIGS. 5-8, the method comprises the following steps, executed as one or more algorithms in the control modules of the distributed control module architecture. The method includes monitoring output of the transmission, typically $N_O$, the operator torque request, $T_{O\_REQ}$, and, available battery power $P_{BAT\_MIN}$ and $P_{BAT\_MAX}$. At least one allowable operating range state, described with reference to Table 1, is identified, along with ranges of allowable input speeds $N_I$ and input torques $T_I$, for each. An output torque range for each of the allowable range states is determined. A cost for operating in each of the operating range states is calculated, and one is selected as a preferred operating range state based upon the calculated costs. The powertrain is controlled to the preferred operating range state thereafter. This operation is preferably executed during each 100 ms loop cycle. This operation is now described in detail.

Figure 5:
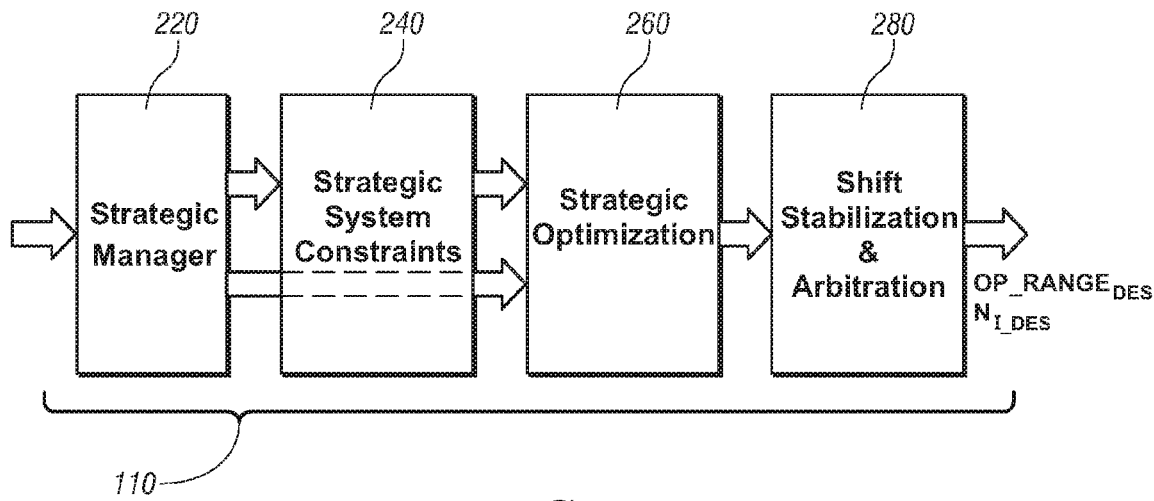

Referring now to FIG. 5, a functional block diagram details the strategic control block 110 of FIG. 4, and depicts inputs $N_O$ and $T_{O\_REQ}$ to a strategic manager segment 220, which has outputs to a system constraint segment 240 and an optimization segment 260. The output of the system constraint segment 240 is input to the optimization segment 260. The outputs of the optimization segment 260 are input to the shift stabilization and arbitration segment 280, which has an output comprising the preferred operating range state, $OP\_Range_{DES}$ and desired input speed, $N_{I\_DES}$.

Figure 6:
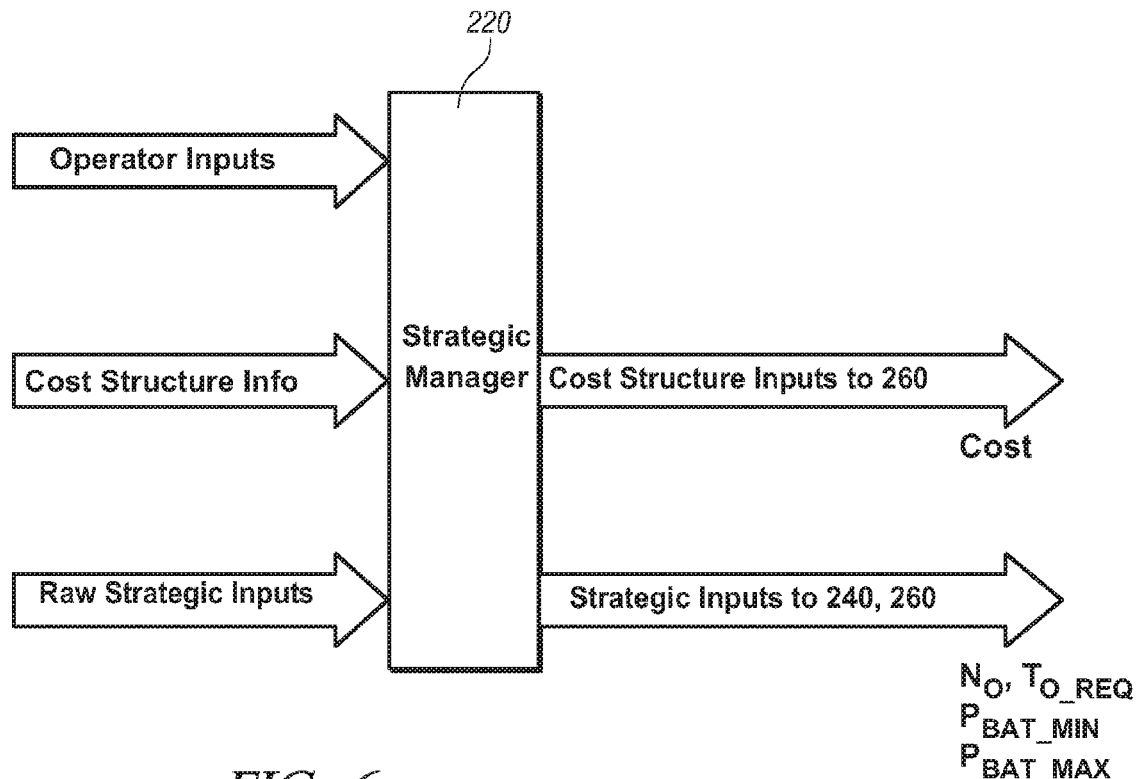

Referring now to FIG. 6, the strategic manager segment 220 includes operator inputs, typically torque requests and other inputs through the UI 13, cost structure information, described hereinbelow, and raw strategic inputs, comprising raw parametric signals related to the hybrid powertrain operating conditions, including those related to the ESD 74. Outputs from the strategic manager segment 220 comprise cost structure information (COST), strategic inputs including transmission output speed $N_O$, range of available battery power $P_{BAT\_MIN}$ and $P_{BAT\_MAX}$, and the operator torque request $T_{O\_REQ}$.

Figure 7:
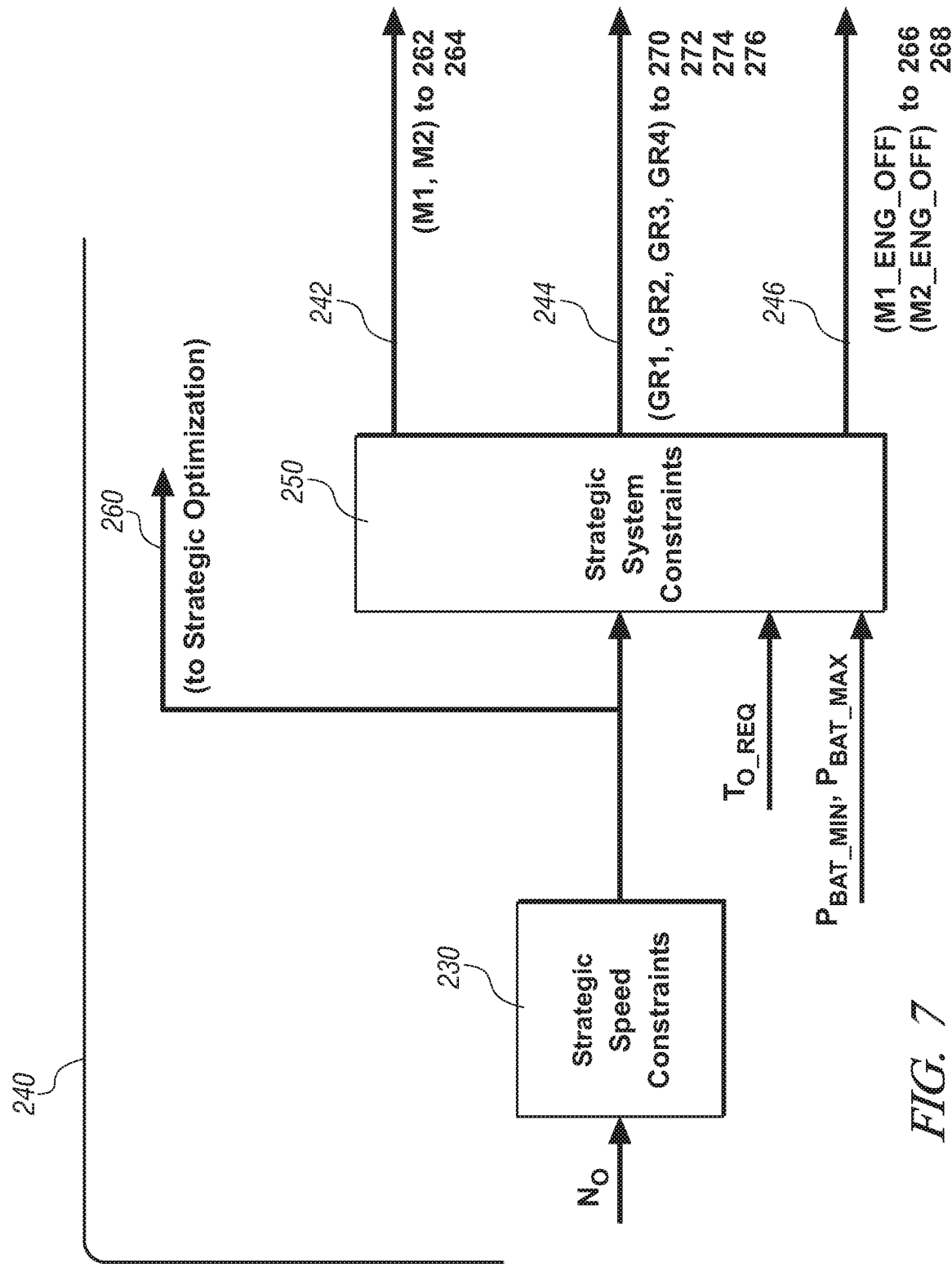

Referring now to FIG. 7, a detailed description of the strategic system constraints segment 240 is now described. The output speed $N_O$ is input to strategic speed constraint segment 230. The speed constraint segment 230 determines maximum and minimum input speeds for operating in each continuously variable mode, i.e., $N_{I\_MIN}\_M1$, $N_{I\_MAX}\_M1$, $N_{I\_MIN}\_M2$, and $N_{I\_MAX}\_M2$, in order to determine which of the hybrid operating range states, i.e., GR1, GR2, GR3, GR4, M1_Eng_Off, M1_Eng_On, M2_Eng_Off, and M2_Eng_On, are allowable based upon current operating constraints, specifically output speed $N_O$.

The allowable hybrid operating range states are output to the strategic optimization segment 260. The allowable hybrid operating range states are output to strategic system constraints segment 250 along with the range of available battery power $P_{BAT\_MIN}$ and $P_{BAT\_MAX}$ and the operator torque request $T_{O\_REQ}$, to determine a range of allowable input speeds $N_{I\_MIN}$, $N_{I\_MAX}$ and/or input torques $T_{I\_MIN}$, $T_{I\_MAX}$ for each of the hybrid operating range states, i.e., GR1, GR2, GR3, GR4, M1_Eng_Off, M1_Eng_On, M2_Eng_Off, and M2_Eng_On, based upon current operating constraints. There are three output paths 242, 244, 246 from segment 240 which supply inputs to optimization segment 260. Output path 242 provides relevant system constraint information, comprising a range of torque values in form of minimum and maximum output torques ($T_{O\_MAX}$, $T_{O\_MIN}$) and minimum and maximum input torques ($T_{I\_MAX}$, $T_{I\_MIN}$) over the range of engine input speeds $N_{I\_MIN}\_M1$, $N_{I\_MAX}\_M1$, $N_{I\_MIN}\_M2$, and $N_{I\_MAX}\_M2$ for each operating mode (M1, M2) with the engine on. This information is communicated to each of segments 262 and 264 of segment 260. Output path 244 provides relevant system constraint information, comprising a range of torque values in form of minimum and maximum output torques ($T_{O\_MAX}$, $T_{O\_MIN}$) and minimum and maximum input torques ($T_{I\_MAX}$, $T_{I\_MIN}$) for each of the fixed gear operations, i.e., GR1, GR2, GR3, GR4. This information is communicated to each of segments 270, 272, 274, and 276 of segment 260. Output path 246 provides relevant system constraint information, comprising a range of torque values in form of minimum and maximum output torques ($T_{O\_MAX}$, $T_{O\_MIN}$) for each operating mode (M1, M2) with the engine off. This information is communicated to each of segments 266 and 268 of segment 260.

Figure 8:
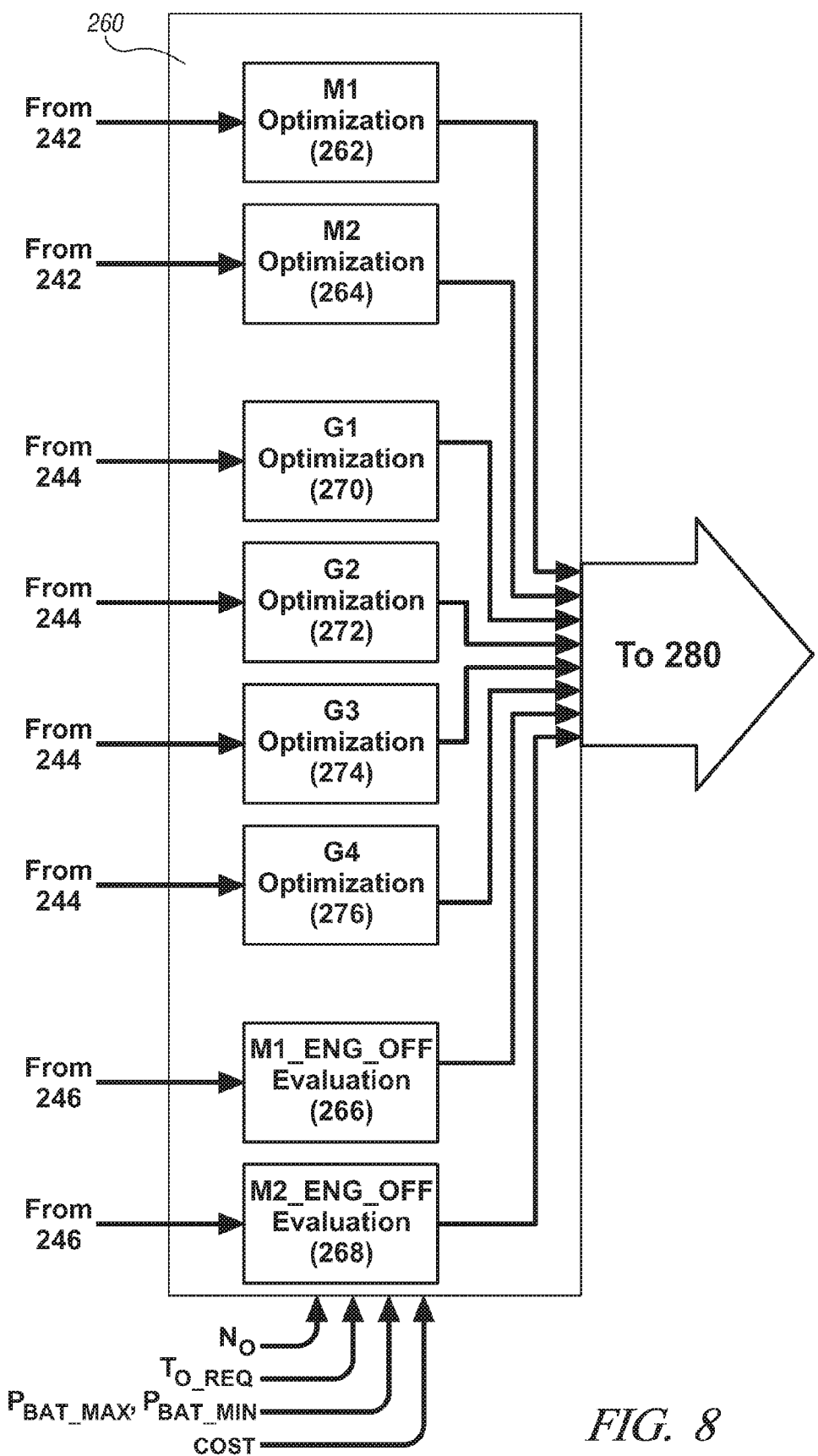

Referring now to FIG. 8, the strategic optimization segment 260 is now described. The allowable hybrid operating range states output from segment 240 to the strategic optimization segment 260 are used to identify which of the optimization segments 262, 264, 266, 268, 270, 272, 274 and 276 are to be executed. Segments 262, 264, 266, 268, 270, 272, 274 and 276 each comprise optimization segments, wherein an optimum operating cost ($P_{COST}$) is determined for each of the permissible operating range states, based upon the inputs previously described, including the previously described range of torque values and costs related to driveability, fuel economy, emissions, and battery life. The optimum operating cost preferably comprises a minimum operating cost at a powertrain operating Δ point within the range of attainable torque values for each operating range state.

Each of segments 262, 264, 266, 268, 270, 272, 274 and 276 generates an output which is provided as input to segment 280. The outputs comprise the respective optimum operating cost, Pcost, as follows: Pcost[M1_Eng_On] and correlated desired input speed $N_{I\_DES}$[M1], output from segment 262; Pcost[M2_Eng_On] and correlated desired input speed $N_{I\_DES}$[M2], output from segment 264; Pcost[M1_Eng_Off] output from segment 266; Pcost[M2_Eng_Off] output from segment 268; Pcost[GR1] output from segment 270; Pcost[GR2] output from segment 272; Pcost[GR3] output from segment 274; and, Pcost[GR4] output from segment 276.

The outputs of the optimization segment 260 are input to the shift stabilization and arbitration segment 280. In this segment, one of the determined operating range states is selected as a preferred operating range state, i.e., OP_Range$_{DES}$, based upon the calculated costs described hereinabove. The preferred operating range state is typically the operating range state having the minimum associated cost, as determined in segment 260. The powertrain is controlled to the preferred operating range state thereafter, although shifting gears and shifting the operating range state may be limited based upon other operating needs related to shift stabilization and powertrain control. This operation is preferably executed during each 100 ms loop cycle.

The cost structure information input to the strategic manager segment 220 and used in optimization segment 260 preferably comprises operating costs which are generally determined based upon factors related to vehicle driveability, fuel economy, emissions, and battery life for the determined torque range. Furthermore, costs are assigned and associated with fuel and electrical power consumption associated with a specific operating point of the powertrain system for the vehicle. Lower operating costs are generally associated with lower fuel consumption at high conversion efficiencies, lower battery power usage, and lower emissions for an operating point, and take into account a current operating range state of the powertrain system. The optimum operating cost ($P_{COST}$) can be determined by calculating a total powertrain system loss, comprising an overall system power loss and a cost penalty, such as can be associated with controlling battery state of charge. The overall system power loss comprises a term based upon engine power loss driven by fuel economy and exhaust emissions, plus losses in the mechanical system (e.g., gears, pumps, belts, pulleys, valves, chains), losses in the electrical system (e.g., wire impedances and switching and solenoid losses), and heat losses. Other losses include electrical machine power losses and internal battery power losses. Other factors may also be considered, including factors related to battery life due to depth of discharge of the ESD 74, current ambient temperatures and their effect on state of charge of the battery. Operating costs are preferably developed relative to specific powertrain/vehicle applications during vehicle calibration pre-production. An exemplary method for determining engine power losses are described in commonly assigned U.S. Patent Application Publication Number 2005/0256633 A2, entitled COST STRUCTURE METHOD INCLUDING FUEL ECONOMY AND ENGINE EMISSION CONSIDERATIONS, the contents of which are incorporated herein by reference.

It is understood that modifications are allowable within the scope of the invention. The invention has been described with specific reference to the embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for controlling a powertrain, comprising:
monitoring an output of an electro-mechanical transmission, an operator torque request, and, available battery power;
identifying at least one permissible operating range state;
determining a torque range for each permissible operating range state;
determining preferred operating conditions and a preferred cost for each permissible operating range state; and,
selecting a preferred operating range state based upon the preferred costs for the permissible operating range states.

2. The method of claim 1, further comprising selectively actuating a plurality of torque-transfer clutches based upon the preferred operating range state.

3. The method of claim 2, further comprising selectively operating a first and a second electrical machine as one of an electrical motor and an electrical generator based upon the preferred operating range state.

4. The method of claim 3, further comprising selectively operating an internal combustion engine based upon the preferred operating range state.

5. The method of claim 4, further comprising selectively operating the internal combustion engine the first and second electrical machines the electro-mechanical transmission and the plurality of torque-transfer clutches to transmit torque therebetween based upon the preferred operating range state.

6. The method of claim 1, further comprising identifying at least one permissible operating range state based upon constraints on an output speed of the electro-mechanical transmission.

7. The method of claim 6, wherein the operating range states comprise two continuously variable modes and four fixed gear modes.

8. The method of claim 7, wherein the plurality of operating range states further comprises the internal combustion engine one of on and off during operation of the powertrain in each of the two continuously variable modes.

9. The method of claim 8, wherein the internal combustion engine being off comprises rotation of a crankshaft of the engine being substantially stopped.

10. The method of claim 8, wherein identifying the permissible operating range states comprises identifying which of the two continuously variable modes and the four fixed gear modes with the internal combustion engine on and off are operative to achieve the operator torque request.

11. The method of claim 1, wherein determining a torque range for each permissible operating range state comprises determining minimum and maximum input torques and minimum and maximum output torques for the electro-mechanical transmission over a range of input speeds when the operating range state consists of a continuously variable mode.

12. The method of claim 1, wherein determining a torque range for each permissible operating range state comprises determining minimum and maximum input torques and minimum and maximum output torques when the operating range state consists of a fixed gear mode.

13. The method of claim 1, wherein determining the preferred cost for each permissible torque range comprises determining an optimum operating cost based upon fuel economy, emissions, and battery life.

14. The method of claim 1, wherein selecting a preferred operating range state based upon the preferred costs for each operating range state further comprising selecting one of the permissible operating range states based upon a minimum cost.

15. Control system for a hybrid powertrain, comprising:
a distributed control module architecture comprising a plurality of signally connected control modules operatively connected to an internal combustion engine and an electro-mechanical transmission and each of first and second electrical machines the powertrain selectively operative in one of a plurality of operating range states;
the control system adapted to execute a plurality of algorithms contained therein to effect the following steps in the sequence set forth, the algorithms comprising:
code to monitor an output of the transmission, an operator torque request, and, available battery power;
code to identify at least one permissible operating range state;
code to determine a torque range for each permissible operating range state;
code to determine preferred operating conditions and a preferred cost for each permissible operating range state; and,
code to select a preferred operating range state based upon the preferred costs for the permissible operating range states.

16. The control system of claim 15, wherein the code to select the preferred operating range state comprises code to select one of two continuously variable modes and four fixed gear modes based upon the output of the transmission and the operator torque request.

17. The control system of claim 16, wherein selected ones of the torque-transfer clutches are activated and selected ones of the torque-transfer clutches are deactivated based upon the preferred operating range state and a desired input speed from the engine.

18. Method for operating a powertrain comprising an internal combustion engine and first and second electrical machines and an electro-mechanical transmission selectively operative to transmit torque therebetween, the method comprising:
monitoring an output speed of the transmission, an operator torque request, and, available battery power;
identifying at least one permissible operating range state;
determining a torque range for each permissible operating range state;
determining preferred operating conditions and a preferred cost for each permissible operating range state;
selecting a preferred operating range state based upon the preferred costs for the permissible operating range states; and,
selectively actuating a plurality of torque-transfer clutches of the electro-mechanical transmission and controlling the internal combustion engine and the first and second electrical machines to achieve the preferred operating range state.

19. The method of claim 18, wherein the operating range states comprise two continuously variable modes and four fixed gear modes.

20. The method of claim 19, wherein the operating range states further comprise the internal combustion engine one of on and off during operation of the powertrain in each of the two continuously variable modes.

* * * * *